US008886201B2

(12) United States Patent
Fang et al.

(10) Patent No.: US 8,886,201 B2
(45) Date of Patent: Nov. 11, 2014

(54) VIRTUAL GROUPS FOR FEMTO-CELL HAND-IN

(75) Inventors: Yonggang Fang, San Diego, CA (US); Rajesh Bhalla, Gahanna, OH (US); Wenfeng Zhang, San Diego, CA (US); Xiaowu Zhao, Shenzhen (CN)

(73) Assignee: ZTE (USA) Inc., Morristown, NJ (US)

( * ) Notice: Subject to any disclaimer, the term of this patent is extended or adjusted under 35 U.S.C. 154(b) by 157 days.

(21) Appl. No.: 12/649,293

(22) Filed: Dec. 29, 2009

(65) Prior Publication Data

US 2010/0197309 A1 Aug. 5, 2010

Related U.S. Application Data

(60) Provisional application No. 61/141,193, filed on Dec. 29, 2008.

(51) Int. Cl.
*H04Q 7/20* (2006.01)
*H04W 36/04* (2009.01)
*H04W 84/04* (2009.01)

(52) U.S. Cl.
CPC ............................. *H04W 36/04* (2013.01); *H04W 84/045* (2013.01)
USPC ........... 455/444; 455/437; 455/438; 455/442; 455/439; 455/450

(58) Field of Classification Search
USPC ............................... 455/436, 404.2, 446, 444
See application file for complete search history.

(56) References Cited

U.S. PATENT DOCUMENTS

| 2003/0002525 | A1* | 1/2003 | Grilli et al. ..................... 370/465 |
| 2008/0101301 | A1* | 5/2008 | Thomas et al. ............... 370/335 |
| 2008/0146226 | A1* | 6/2008 | Claussen et al. ........... 455/435.1 |
| 2009/0097451 | A1* | 4/2009 | Gogic ........................... 370/331 |
| 2009/0280819 | A1* | 11/2009 | Brisebois et al. ............. 455/446 |
| 2009/0312022 | A1* | 12/2009 | Viorel et al. .................. 455/436 |

\* cited by examiner

*Primary Examiner* — Charles Appiah
*Assistant Examiner* — Randy Peaches
(74) *Attorney, Agent, or Firm* — Perkins Coie LLP

(57) ABSTRACT

Techniques, apparatuses, and systems for handling femto-cell hand-in requests can include operating a macro-cell base station to provide wireless service to wireless devices in a geographical coverage area; receiving, from a wireless device, a message indicative of the wireless device's reception of a base station radio signal, the message including a base station identifier; controlling multiple femto-cell base stations that are assigned to the base station identifier to communicate with the wireless device and to report a reception of a radio signal from the wireless device; and transferring the wireless device from the macro-cell base station to a femto-cell base station of the multiple femto-cell base stations that reports a reception of the radio signal from the wireless device. The multiple femto-cell base stations can provide wireless service in different nonadjacent portions of the geographical coverage area.

17 Claims, 7 Drawing Sheets

VIRTUAL GROUPS FOR FEMTO-CELL HAND-IN

PRIORITY CLAIM AND CROSS REFERENCE TO RELATED APPLICATION

This document claims the benefit of the priority of U.S. Provisional Application Ser. No. 61/141,193, filed Dec. 29, 2008 and entitled "Virtual Groups for Femto-Cell Hand-In," the entire contents of which are incorporated by reference as part of the disclosure of this document.

BACKGROUND

This document relates to wireless communication systems, apparatuses, and techniques.

Wireless communication systems and apparatuses use electromagnetic waves to communicate with fixed and mobile wireless communication devices, e.g., mobile wireless phones and laptop computers with wireless communication cards, that are located within cells of coverage areas of the systems. Wireless communication equipment such as base stations can be spatially distributed to provide radio coverage in one or more geographic service areas. A base station can provide coverage in one or more radio cells. Depending on the size and capacity, a cell may be categorized as a macro-cell, micro-cell, pico-cell, or femto-cell. The base stations can include directional antennas to divide each cell into different cell sectors where each antenna covers one sector. This sectorization of a cell increases the communication capacity of the system.

Various wireless communication systems can include a network of one or more base stations to communicate with one or more wireless devices such as a mobile device, cell phone, wireless card, mobile station (MS), user equipment (UE), access terminal (AT), or subscriber station (SS). A base station can be referred to as an access point (AP) or access network (AN) or can be included as part of an access network. Further, a wireless communication system can include one or more core networks to control one or more base stations.

In some wireless communication networks, the base stations may be configured in a multi-tier configuration. For example, a base station may be placed in a radio cell of another base station to provide radio coverage of a small section of the radio cell. In this case, the larger cell can be considered as a macro-cell because another base station is located within the macro-cell region and the smaller cell inside the macro-cell can be considered a micro-cell. This macro-cell/micro-cell configuration can expand the radio coverage of the network and can increase the radio frequency bands and thus the communication capacity of the network. A macro-cell can include one or more micro-cells depending on the needs for radio coverage in that macro-cell. A macro-cell base station is an example of a base station that provides wireless coverage in a macro-cell. Some wireless communication systems can operate in a tiered base station configuration with multiple pico-cells. Some wireless communication systems can operate in a tiered base station configuration with multiple femto-cells.

A femto-cell can provide a smaller sized cell coverage area. A femto-cell can offer an alternative wireless service option to various locations such as home and business locations. A base station such as a femto-cell access point (FAP) provides wireless service to mobile stations based on one or more wireless air link technologies. A FAP such as a femto-cell base station is an example of a base station that provides wireless coverage in a femto-cell. Various examples of wireless air link technologies include Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), evolved UTRAN (E-UTRAN), Long-Term Evolution (LTE), and Worldwide Interoperability for Microwave Access (WiMAX). Various examples of wireless technology standards bodies include 3GPP, 3GPP2, and IEEE 802.16.

A FAP can use wired or wireless broadband connection at home or business, such as those provided by Asymmetric digital subscriber line (ADSL), cable modem, fiber, wireless microwave, WiMAX technologies, as the backhaul connection for connecting the FAP to an operator's core network equipment. When a wireless device enters a femto-cell coverage area, the wireless device can communicate with a FAP over a wireless connection and can continue to receive services via the broadband backhaul connection to the operator's core network equipment.

SUMMARY

This document describes, among other things, technologies that handle femto-cell hand-in requests.

In one aspect, techniques for handling femto-cell hand-in requests can include operating a macro-cell base station to provide wireless service to wireless devices in a geographical coverage area; receiving, from a wireless device, a message indicative of the wireless device's reception of a base station radio signal, the message including a base station identifier; controlling multiple femto-cell base stations that are assigned to the base station identifier to communicate with the wireless device and to report a reception of a radio signal from the wireless device; and transferring the wireless device from the macro-cell base station to a femto-cell base station of the multiple femto-cell base stations that reports a reception of the radio signal from the wireless device. The multiple femto-cell base stations can provide wireless service in different nonadjacent portions of the geographical coverage area.

Other implementations can include corresponding systems, apparatus, and computer programs, configured to perform the actions of the techniques, encoded on computer readable mediums.

These and other implementations can include one or more of the following features. Controlling the multiple femto-cell base stations can include sending a handoff request message to each of the femto-cell base stations. Controlling the multiple femto-cell base stations can include controlling a femto-cell base station to send a handoff request acknowledgment message to a core network based on a reception of the radio signal from the wireless device. A received message can include a measurement message. A measurement message can include one or more base station identifiers and one or more respective measurements of base station radio signals. A base station radio signal can be generated based on a base station identifier. In some implementations, a base station identifier is a pseudorandom noise (PN) code. Operating a macro-cell base station to provide wireless service can include operating the macro-cell base station based on a Code Division Multiple Access (CDMA) air link technology. Operating a macro-cell base station to provide wireless service can include operating the macro-cell base station based on a Long Term Evolution (LTE) technology.

In another aspect, techniques for handling femto-cell hand-in requests can include controlling assignment of a first group of communications codes and a second group of communications codes; operating a first base station to provide coverage to a service area; communicating with a plurality of femto-cell base stations within the service area; and assigning at least one of the communication codes from the second group to members of a virtual communication code group. The virtual communication code group can include two or more of the femto-cell base stations. Each femto-cell base station can provide coverage to at least a portion of the service area. The first base station can use a communication code from the first group for wireless identification. Other implementations can include corresponding systems, apparatus, and computer programs, configured to perform the actions of the techniques, encoded on computer readable mediums.

These and other implementations can include one or more of the following features. Implementations can include controlling the femto-cell base stations of the virtual communication code group to attempt to handle a hand-in request initiated by a mobile station. Implementations can include selecting one of the controlled femto-cell base stations to complete the hand-in request. Implementations can include controlling the femto-cell base stations of the virtual communication code group who are not selected to complete the hand-in request to free resources allocated for the hand-in request.

In another aspect, techniques for handling femto-cell hand-in requests can include assigning a communication code from a first group of communication codes used for wireless identification to a base station, where the base station is configured to provide coverage to a service area; assigning a communication code from a second, different group of communication codes used for wireless identification to multiple femto-cell access points that provide coverage in different nonadjacent portions of the service area; and operating multiple femto-cell access points assigned to the same communication code to handle a hand-in request from a mobile station in communication with the base station. Other implementations can include corresponding systems, apparatus, and computer programs, configured to perform the actions of the techniques, encoded on computer readable mediums.

These and other implementations can include one or more of the following features. Implementations can include controlling the femto-cell access points assigned to the same communication code to report a status of a handshake with the mobile station. Implementations can include selecting one of the controlled femto-cell access points to complete the hand-in request. Implementations can include controlling the femto-cell access points assigned to the same communication code who are not selected to complete the hand-in request to free resources allocated for the hand-in request. The first group can include pseudorandom noise codes and the second group can include different pseudorandom noise codes.

Apparatus and systems for wireless communications can include one or more macro-cell base stations configured to provide wireless service to wireless devices in a geographical coverage area and receive, from a wireless device, a message indicative of the wireless device's reception of a base station radio signal. Apparatus and systems can include a mechanism configured to control multiple femto-cell base stations that are assigned to the base station identifier to communicate with the wireless device and to report a reception of a radio signal from the wireless device. Apparatus and systems can include a mechanism configured to transfer the wireless device from the macro-cell base station to a femto-cell base station of the multiple femto-cell base stations that reports a reception of the radio signal from the wireless device.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
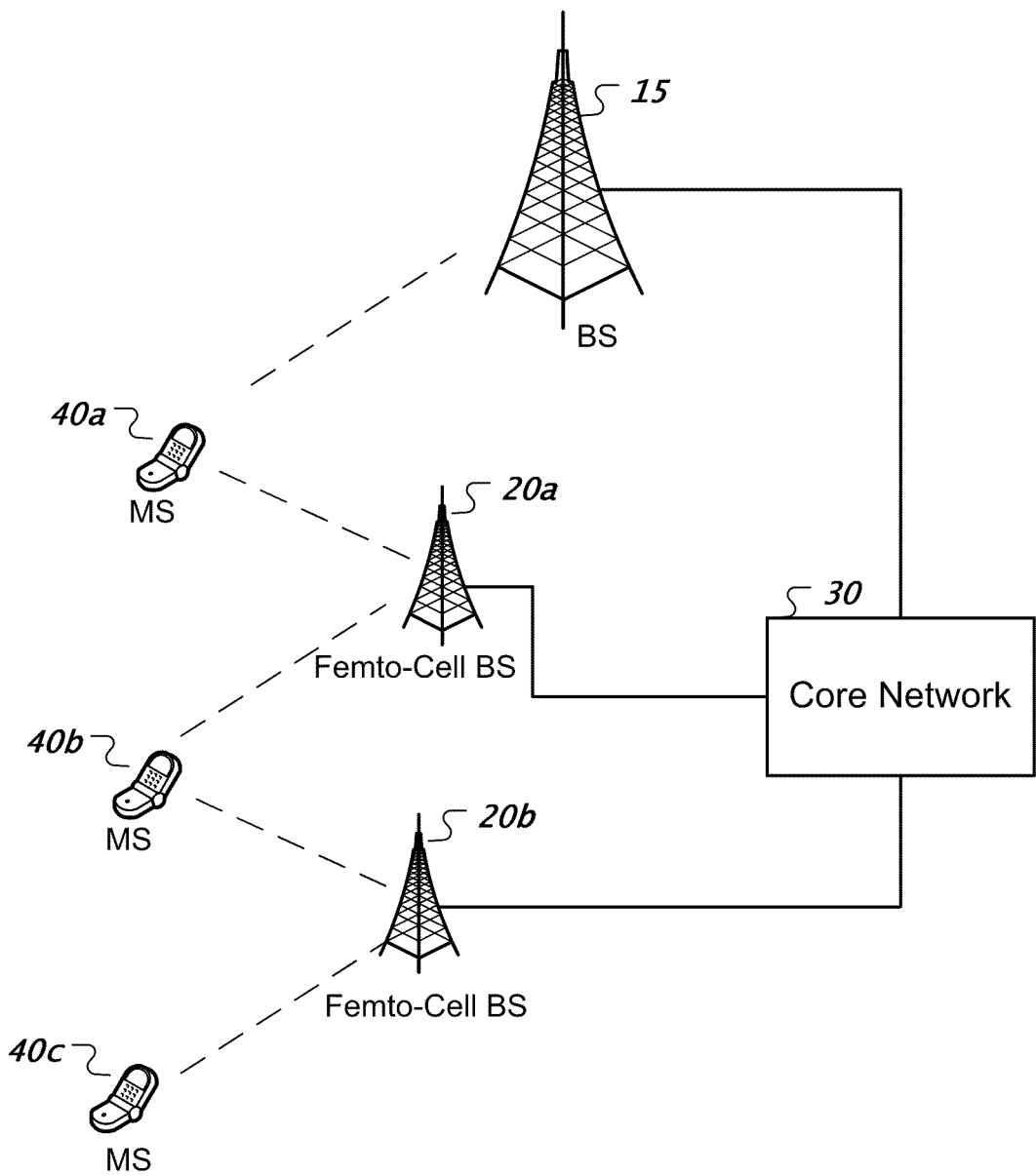
FIG. 1A shows an example of a wireless communication system.

FIG. 1A shows an example of a wireless communication system. A wireless communication system can include a base station (BS) 15 such as macro-cell, micro-cell, or pico-cell base stations and a core network 30. A core network 30 can include one or more components such as one or more servers. In some implementations, a core network 30 includes a Mobile Switching Center (MSC). The wireless communication system can use one or more femto-cell access points (FAP) such as femto-cell base stations 20a, 20b to communicate with one or more wireless devices such as mobile stations 40a, 40b, 40c (MSs). A base station 15, 20a, 20b can transmit a signal on a forward link (FL), or called a downlink (DL), to one or more mobile stations 40a, 40b, 40c. Mobile stations 40a, 40b, 40c can transmit a signal on a reverse link (RL), or called an uplink (UL), to one or more base stations 15, 20a, 20b. The wireless communication system can be operated under a wireless protocol such as 3GPP, 3GPP2, or IEEE 802.16/WiMAX.

In some wireless communication systems, such as public wireless networks, different operators operate different wireless networks. A user can subscribe to an operator's network to obtain wireless services. A wireless network can have open access for the network's subscribers. Wireless devices may prefer to use a subscribed wireless network when available.

A FAP may have different characteristics than those of a wireless network. Although femto-cell networks can be operated by a single network operator, a FAP can be owned by an individual subscriber. For example, a home-based FAP can be owned and operated by a subscriber of a wireless network. The operator of the wireless network can grant a home-based FAP access to the wireless network to provide additional wireless service. In some implementations, the operator of the wireless network can assign parameters such as a specific frequency band and a pilot pseudorandom noise code to a home-based FAP. Different FAPs can be owned by different owners which may enforce different access types, e.g., open access or closed access. In some implementations, an owner can setup access controls for a FAP to selectively grant access to a wireless device.

Figure 1B:
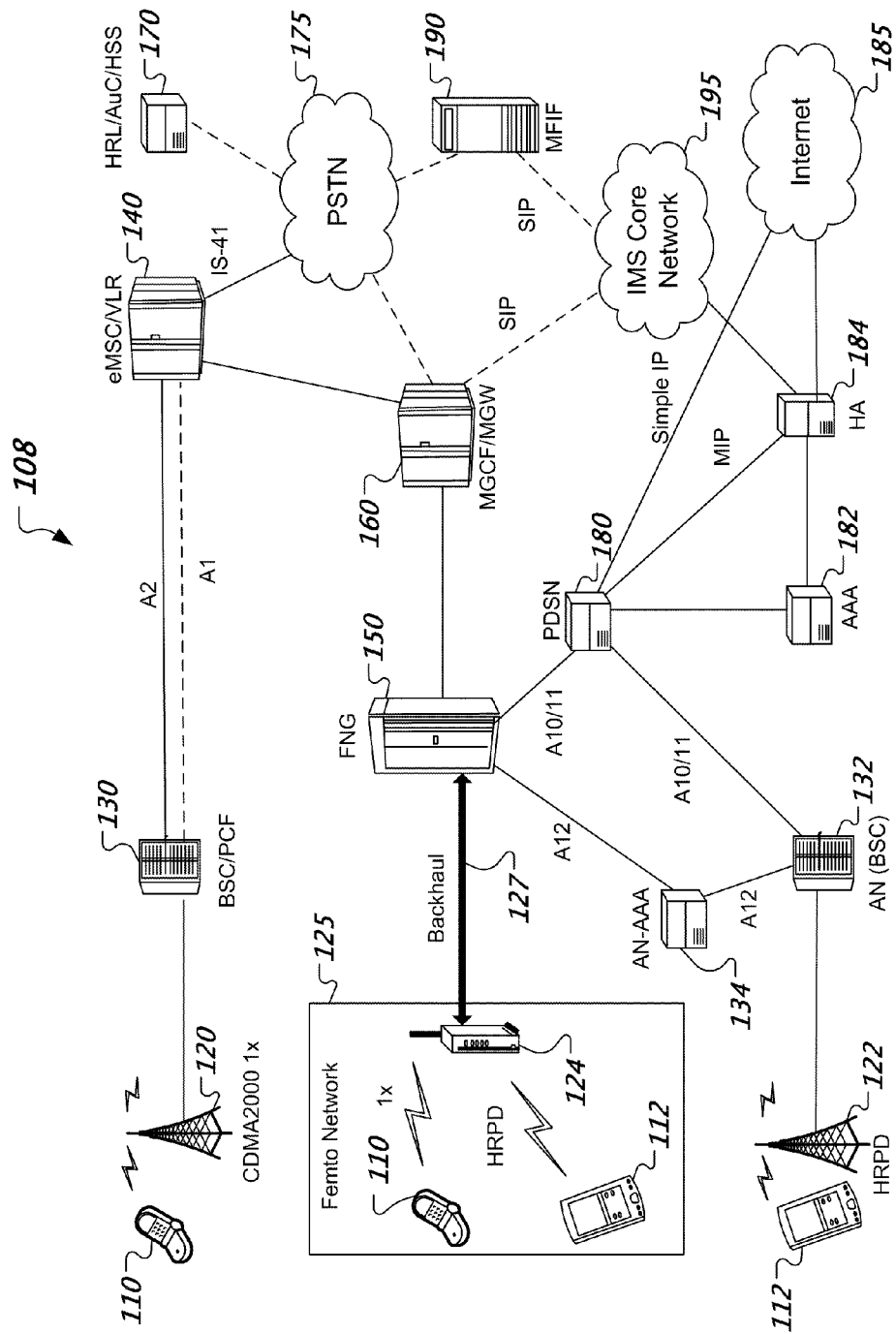
FIG. 1B shows another example of a wireless communication system.

FIG. 1B shows another example of a wireless communication system. A wireless communication system 108 can include one or more CDMA2000 1x circuit networks and one or more HRPD packet data networks to communicate with different wireless devices such as a mobile station 110 or an access terminal 112. In a CDMA2000 1x circuit network, a CDMA2000 1x mobile station 110 can connect to a macro cell through a CDMA2000 1x macro-cell BS 120. Macro-cell BS 120 connects with a Base Station Controller (BSC) 130. The BSC 130 can implement a Packet Control Function (PCF). The BSC 130 connects with a switching center such as a MSC or MSC emulator (eMSC) 140. The eMSC 140 can communicate with a home location register (HLR) 170 through a public switched telephone network (PSTN) 175.

In a HRPD network, a HRPD AT 112 can connect with a HRPD macro-cell through a HRPD base station 122, and an Access Network (AN)/Base Station Controller 132. Packet Data Serving Node (PDSN) 180 and Home Agent (HA) 184 can provide Internet Protocol (IP) connections such as simple and mobile IP connections to wireless devices. PDSN 180 and HA 184 can communicate with a network such as the Internet 185.

When a wireless device such as a MS 110 or AT 112 enters a home or office femto-cell network area 125, a wireless device can connect with a FAP 124 provide wireless service in the femto-cell network area 125. A FAP 124 can communicate with a Femto Network Gateway (FNG) 150 via a backhaul network 127 such as a wired or wireless broadband connection. A FAP 124 can provide an air link connection using wireless technologies such as those established by the 3GPP or 3GPP2 standard groups.

A FNG 150 can include a Security Gateway. In some implementations, FNG 150 can perform FAP secure tunnel management procedures such as tunnel establishment and release, allocation of an IP address to a FAP from a serving CDMA2000 network, and encapsulation and de-capsulation of traffic to and from a FAP. FNG 150 can provide policy based management of voice and data traffic control and aggregation to a CDMA2000 core network and call manager. A FAP 124 can access subscription information from databases operated by servers such as HLR 170, authentication, authorization and accounting (AAA) server 182, and AN-AAA 134. The wireless communication system 108 can include a Media Gateway Control Function (MGCF)/Media Gateway (MGW) 160, an interworking function such as a MFIF 190, and an IP Multimedia Subsystem (IMS) core network 195.

Figure 2:
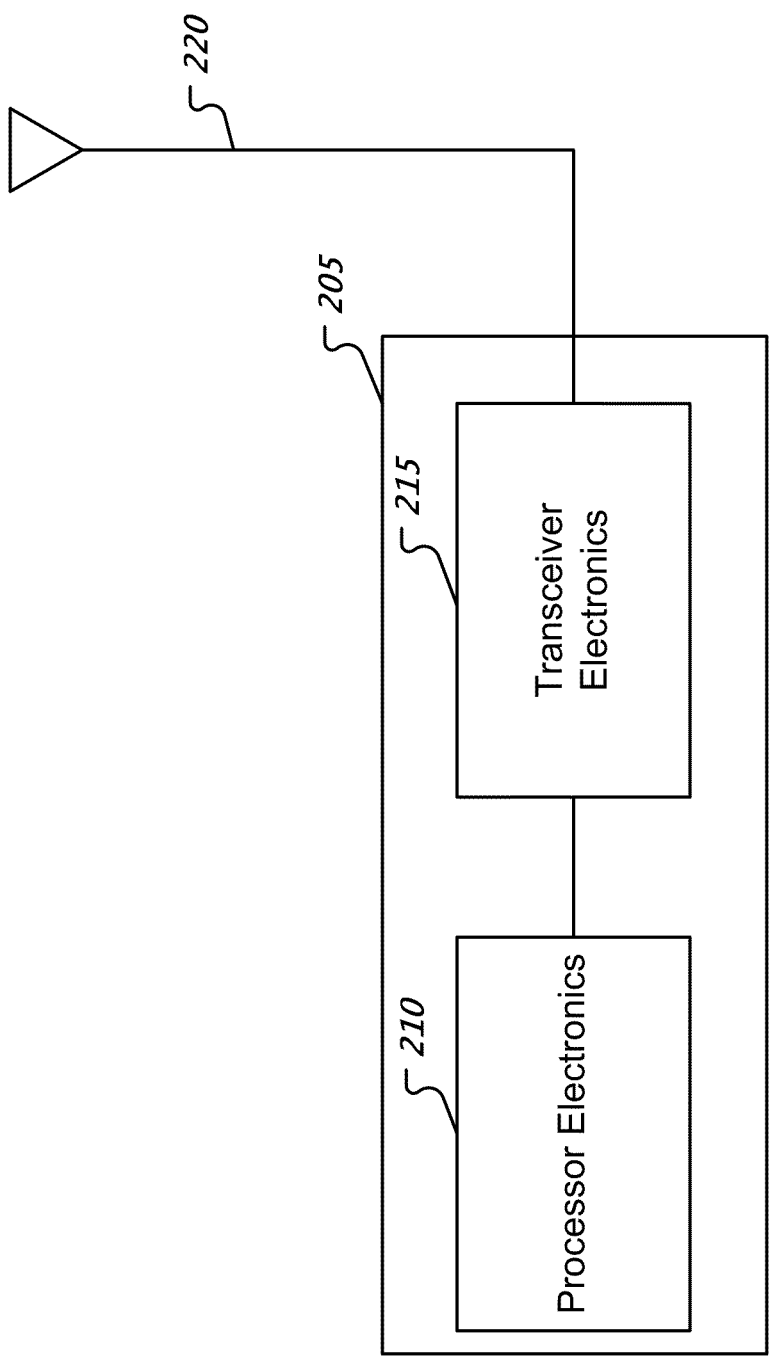
FIG. 2 shows an example of a radio station architecture.

FIG. 2 shows an example of a radio station architecture for use in a wireless communication system. A radio station 205 such as a base station or a mobile station can include processor electronics 210 such as a microprocessor that implements methods such as one or more of the techniques presented in this document. A radio station 205 can include transceiver electronics 215 to send and receive wireless signals over a communication interface such as one or more antennas 220. A radio station 205 can include other communication interfaces for transmitting and receiving data. A radio station 205 can include one or more memories configured to store information such as data and/or instructions.

A base station in a wireless communication system can use an identifier to identify itself to a wireless device. In some implementations, an identifier is used by the baseband firmware of access terminals to search for and lock to the radio transmission of a particular cell. A base station can use an identifier such as a pseudorandom noise (PN) code to identify and distinguish itself from other neighboring base station cells or sectors. For example, a pseudorandom noise code called a pilot PN code can distinguish individual base stations in a wireless network. In some implementations, a pilot PN code can distinguish between different cells in a wireless network. For example, a base station can use two or more PN codes to operate two more cells. In some implementations, a pilot PN code is in accordance with a standard such as a 3GPP2 standard. In some implementations, each base station transmits a pilot PN sequence with its assigned PN code offset.

When a wireless device is in the process of acquiring a wireless network, the wireless device's baseband firmware can search for one or more pilot PN signals transmitted by neighboring base stations. The wireless device can select a base station based on one or more criteria. For example, a wireless device can select the base station with the strongest pilot signal. The wireless device can lock on to the pilot signal from the selected base station and then decode signaling messages from that base station.

In some implementations, each base station in a wireless communication system is assigned a pilot PN code to identify itself at a physical layer. In some implementations, base stations transmit a signal based on their assigned pilot PN code over the air continuously for mobile stations to monitor and acquire the network. A wireless device can use a detected PN code for identifying a base station for the purpose of monitoring and reporting the base station's pilot strength in measurement report messages. The wireless device can use a detected PN code for connecting with the associated base station and decoding the base station's signaling messages.

In some implementations, a PN code can be represented by a 9-bit value. A 9-bit PN code provides a maximum of 512 different PN sequences. In some network designs, pilot PN codes may be re-used amongst base stations in a wireless network. To eliminate or reduce ambiguity in identifying target cells or sectors in a handoff scenario, a wireless device should not receive pilot signals with the same pilot PN sequence from different base stations within a handoff region.

In some wireless communication system deployments, radio network planning is use to assign identifiers to base stations. In some implementations, radio network planning includes assigning a pilot PN code for one or more base stations of a network. Radio network PN planning can include providing that there are no duplicate assignments of pilot PN codes to base stations in an overlapping wireless coverage area. Such PN codes, may however, be reassigned or reused for base stations in non-overlapping wireless coverage areas.

A wireless communication system can interface with numerous FAPs. Therefore, radio network planning can include assigning one or more PN codes to FAPs associated with a wireless communication system. For example, in a dense deployment of FAPs, a coverage area of a macro-cell BS may overlap a large number of smaller femto-cell coverage areas. However, the number of femto-cells in a coverage area of a macro-cell BS may exceed an available number of PN codes as specified by a wireless technology standard. Therefore, it may be required to assign the same PN code to two or more FAPs. Duplicated assignment of PN codes to FAPs within a macro-cell's wireless coverage area may cause ambiguity for a wireless communication system to uniquely identify a target femto-cell for a hand-in from a macro-cell to a femto-cell.

Figure 3:
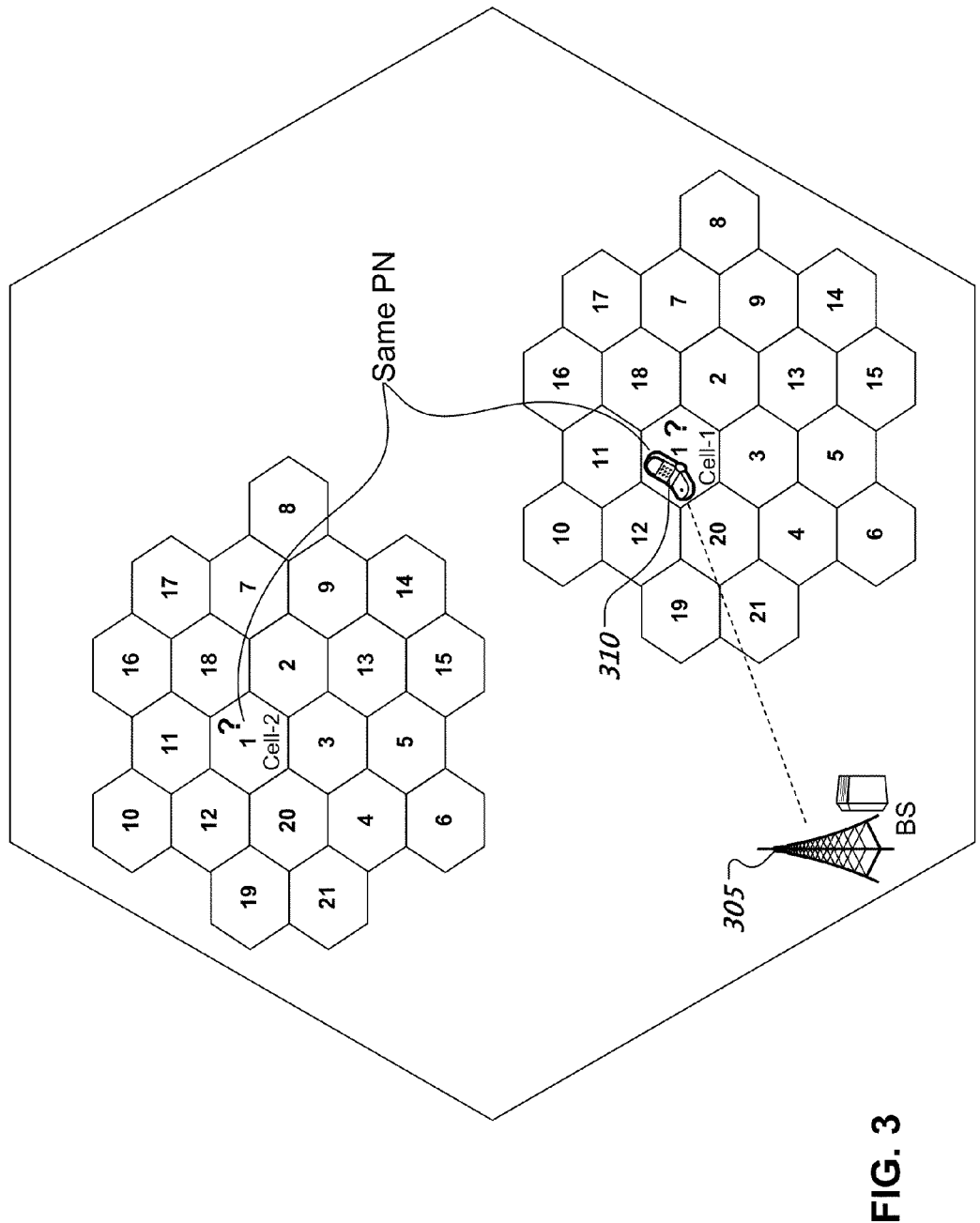
FIG. 3 shows an example of pseudorandom noise code ambiguity in a femto-cell hand-in scenario.

FIG. 3 shows an example of pseudorandom noise code ambiguity in a femto-cell hand-in scenario. A macro-cell BS 305 is assigned a pilot PN code of 256. A wireless device 310 is communicating with the macro-cell BS 305. The wireless device 310 is within a wireless range of a femto-cell, Cell-1, such as a home or office femto-cell. Cell-1 is assigned a pilot PN code of PN1. In some implementations, a home femto-cell is a femto-cell which has been registered with a wireless operator's core network. In the same coverage region of the macro-cell BS 305, there is another femto-cell, Cell-2. Cell-2 is assigned the same pilot PN code of PN1.

The wireless device 310 detects a pilot signal associated with Cell-1. The wireless device 310 reports the pilot strength measurement to the macro-cell BS. Reporting a pilot strength measurement can include sending a Pilot Strength Measurement Report (PSMR) message in cdma2000 1x wireless network. In some implementations, reporting a pilot strength measurement can include sending a Route Update Message (RUM) message in a CDMA2000 HRPD wireless network.

Reporting a pilot strength measurement can including identifying a femto-cell associated with the measured pilot signal. In a reporting message, the wireless device 305 can include a PN code, associated with the measured pilot signal, to identify the femto-cell to the macro-cell BS 305. The macro-cell BS 305 may not be able to distinguish which FAP femto-cell the wireless device 310 is measuring based solely on a reported pilot PN code, because multiple FAPs in this example share the same pilot PN code. If the macro-cell BS 305 initiates a hand-in to an inappropriate femto-cell, such as Cell-2 that is outside of a wireless range of the wireless device 310, an active voice or data connection of wireless device 310 may be dropped.

Wireless communication systems such as one based on 3GPP, 3GPP2, and WiMAX technologies are widely deployed. Accommodating the increasing numbers of FAPs within a deployed wireless communication system can present difficulties. For example, it can be difficult to roll out changes to an existing air interface specification to accommodate FAPs. This document describes, among other things, examples, and implementations of techniques and network designs that effect femto-cell hand-ins within a wireless communication system without requiring a change in existing air interface specifications. Such implementations can improve call handling, e.g., reducing or eliminating dropped calls. The described techniques and systems can accommodate an increased number of FAPs within a coverage area of a macro-cell BS.

In one aspect, techniques for handling femto-cell hand-ins can include using a first group of communications codes and a second group of communications codes to identify base stations to wireless devices. In some implementations, large coverage area base stations are assigned one or more communication codes from the first group, whereas small coverage area base stations, operating within larger coverage areas, are assigned a communication code from the second group. Techniques for handling femto-cell hand-ins can include assigning identical communication codes from the second group to multiple base stations that provide wireless service within a larger wireless coverage area. Techniques for handling femto-cell hand-ins can include operating base stations that have been assigned identical communications codes to determine which one of the base stations is in a radio communication range of a wireless device requesting a hand-in.

Communications code space such as a PN code space can be divided into multiple groups for assignments to base stations. In some implementations, the pool of available pilot PN codes is divided into two sets, e.g., two sets labeled S-I and S-II. Pilot PN codes in S-I are reserved for macro-cells, whereas pilot PN codes in S-II are reserved for femto-cells. In some implementations, S-I is reserved for one or more of marco-cells, micro-cells, and pico-cells.

In some implementations, pilot PN codes in S-I and S-II can have the same PN distance. In some implementations, pilot PN codes in S-I and S-II have different PN distances. In some implementations, a PN distance is determined by a configurable PN distance parameter such as PN_INC in the 3GPP and 3GPP2 specifications. The PN distance parameter can be broadcast over the air. In some implementations, a PN distance for pilot PN codes reserved for femto-cells, e.g., S-II, can be configured as a fraction of the PN distance configured for pilot PN codes reserved for macro-cells, e.g., S-I.

Femto-cell reserved pilot PN codes, e.g., S-II, can be reused for FAPs within a macro-cell BS coverage area. In some cases, a smaller number of reserved PN codes in S-II may require a larger PN_INC. In some cases, the greater the number of FAPs in a macro-cell BS coverage area may increase the possibility of pilot PN code ambiguity.

A FAP can transmit a pilot signal based on an assigned PN code from S-II. A wireless communication system can include one or more mechanisms to assign a PN code to a FAP. In some implementations, a FAP can include a self-listening function to obtain a PN code assignment. In some implementations, a femto network configuration management server can assign a PN code to a FAP. In some implementations, a wireless communication system can use a PN assignment algorithm to unambiguously assign different PN codes to FAPs that are in adjacent neighboring cells.

In some implementations, a wireless communication system can include a core network server configured to group femto-cells, with the same PN code from S-II and in the same coverage of a macro-cell BS, in a virtual group. In some implementations, a macro-cell BS can group femto-cells within its coverage area that are assigned to the same pilot PN code from set S-II in a virtual group. Virtually grouped femto-cells can provide wireless service within different nonadjacent coverage areas of a macro-cell BS. A macro-cell BS can have multiple virtual PN groups. The number of virtual PN groups can be based on a quantity defined by the number of elements of S-II divided by PN_INC. A virtual PN group can be transparent to a macro-cell network.

Figure 4:
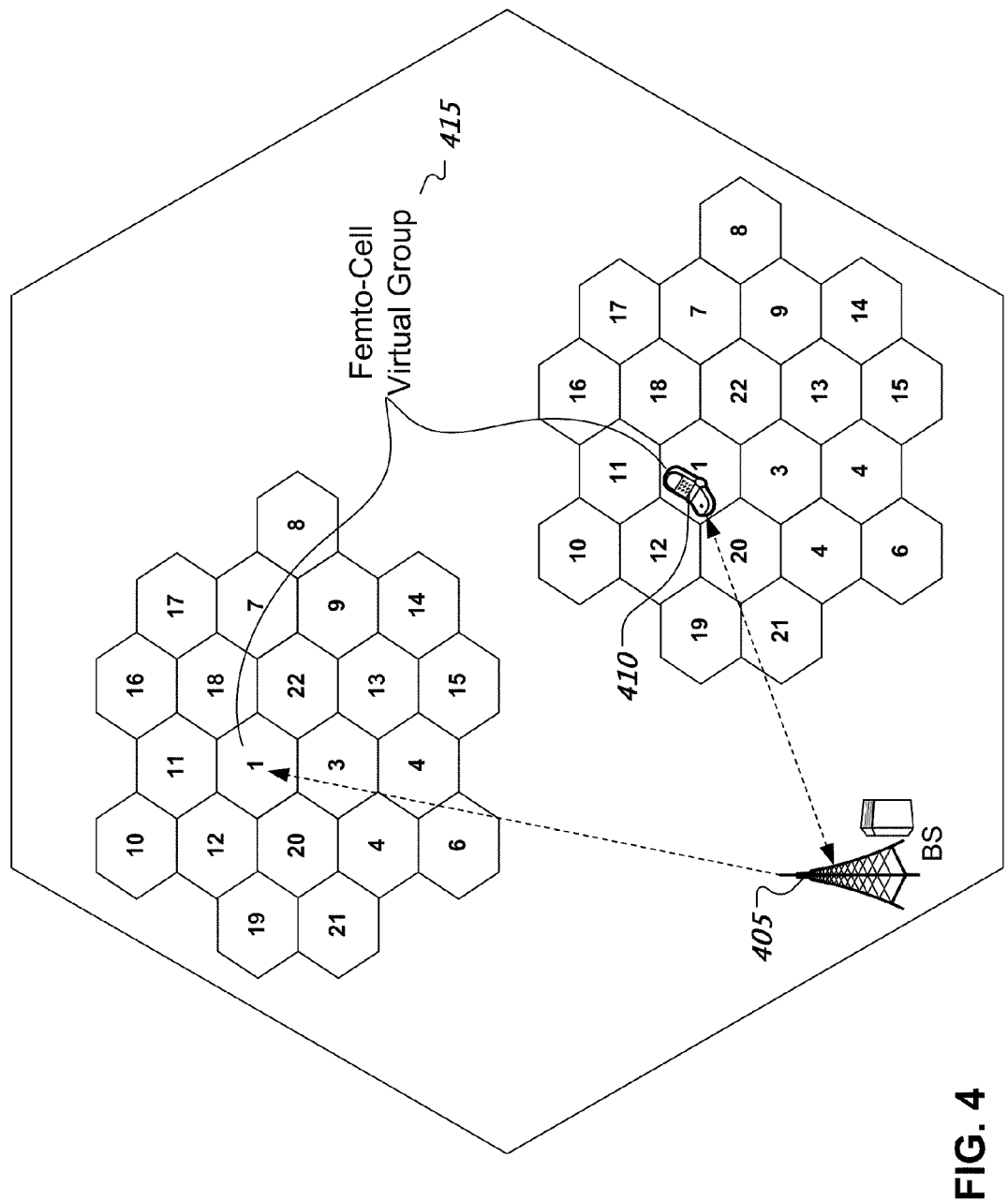
FIG. 4 shows an example of a femto-cell hand-in based on a femto-cell virtual group.

FIG. 4 shows an example of a femto-cell hand-in based on a femto-cell virtual group. A wireless communication system includes a macro-cell BS 405 that is assigned a pilot PN code from S-I, such as 256. In this example, multiple femto-cells are assigned the same pilot PN code from S-II, such as PN1. A femto-cell virtual group 415 is associated with these identically assigned femto-cells. A virtual group 415 can be referred to as a virtual PN group.

A wireless device 410 is communicating with the macro-cell BS 405. The wireless device 410 comes within a wireless range of a FAP's femto-cell assigned with PN1 and reports the FAP's signal and an associated PN identifier of PN1 to the wireless communication system to initiate a hand-in. The system can resolve the PN identifier of PN1 into a specific one of the FAPs. In this example, the system operates the macro-cell BS 405 to control multiple FAPs associated with the femto-cell virtual group 415 to attempt to communicate with the wireless device 410. The FAP within a wireless range of the wireless device 410 is able to complete a hand-in, whereas the FAP(s) in the femto-cell virtual group 415 that are not in the wireless range of the wireless device 410 are not able to complete the hand-in.

In some implementations, pilot PN codes reserved for femto-cells are configured as neighbor PN codes of a macro-cell BS. A macro-cell BS can transmit a neighbor list message that contains one or more neighbor PN codes. In some implementations, the macro-call can transmit via broadcast or unicast signaling messages a neighbor list message. Various examples of neighbor list message include general neighbor list message, extended neighbor list message, and private neighbor list message based on the CDMA2000 1x specification.

When a mobile station is communicating with a macro-cell BS, the mobile station can monitor a pilot strength of one or more neighbor femto-cells identified by pilot PN codes specified in one or more neighbor list messages. In some implementations, a mobile station can determine a signal to noise ratio (SNR) of a femto-cell signal. A mobile station can report pilot strength data to a macro-cell BS in a measurement message such as a pilot strength measurement message (PSMM), a power measurement report message (PMRM) in a CDMA2000 1x system, or a route update message (RUM) in a CDMA2000 HRPD system.

In some implementations, if a measurement such as a pilot strength or a SNR of a neighbor femto-cell is better than the serving macro-cell BS, the macro-cell BS can trigger a handoff procedure. In some implementations, a macro-cell BS can determine whether the mobile station is requesting a handoff to a femto-cell based on a target pilot PN code in a measurement message.

A macro-cell BS can inform a core network of a base station, such as a femto-cell base station, detected by a mobile station. In some implementations, a macro-cell BS can request a core network to simultaneously sends handoff request messages to femto-cells associated with a virtual PN group identified by the target pilot PN code in a measurement message. The core network can request that the FAPs associated with the femto-cells establish connections to a femto-cell gateway (FGW). In some implementations, FAPs associated with the virtual PN group can start to transmit null forward traffic frames over an air interface based on establishing a connection with a FGW.

FAPs associated with the virtual PN group can attempt to demodulate and decode a reverse link traffic channel transmitted from the mobile station requesting the hand-in to perform a handshaking operation with the mobile station. The FAP that is within a wireless communication range of the mobile station performs the handshaking with the mobile station. FAPs can use a timer to control a duration for searching for a reverse link signal. The FAPs that are not within a wireless communication range of the mobile station can terminate the search based on an expiration of the timer. A failure to detect the mobile station's reverse link signal can cause a FAP to report the failure to the core network. Such a failure can cause the FAP to tear down air-link connection(s) used to search for the mobile station. The failure can be treated as an unsuccessful air link connection setup In some implementations, if one femto-cell associated with a virtual group is able to complete the handshake, then the unsuccessful connection establishment(s) of one or more femto-cells associated with the virtual group are not considered as an unsuccessful handoff or handoff failure by Operation Administration and Maintenance (OAM) statistic reporting. In some implementations, if all of the femto-cells associated with the virtual group are unsuccessful in performing a handshaking operation with the mobile station, then a failure can be reported by the OAM. In some implementations, this type of failure can be considered as a failure of the mobile station to hand-in to a femto-cell.

A BS, such as a macro-cell BS, can group femto-cells that are within its coverage area and having identical pilot PN codes in respective virtual groups. When processing hand-in requests from a mobile station that are indicative of a virtual group, a BS can cause a core network to direct hand-in messages to all femto-cells in the indicated virtual group.

In some implementations, the FAP in the virtual group that is successful in handshaking with a mobile station can send a handoff request acknowledgement message back to the core network to commence the handoff procedure. The FAP(s) in the virtual group that are not successful can send a handoff request acknowledgement that includes a handshaking failure code. In some implementations, the unsuccessful FAP(s) can send a handoff request acknowledgement that includes an access denied failure code. In some implementations, the unsuccessful FAP(s) does not respond. In some implementations, a core network can include a mechanism to receive handoff request acknowledgements and to process them to determine which acknowledgement contains a successful handshaking indication. Based on a successful handoff request acknowledgement message, a core network can send a handoff command message to a serving macro-cell BS to start a handoff to the FAP that is successful in handshaking with the mobile station.

In some implementations, a virtual group hand-in procedure can cause each FAP in a virtual group to allocate its resource(s) independently. In some implementations, a handoff request message does not include the same resource information such as a Walsh code traffic index, and frame offset. Not including the same resource information can give more flexibility to FAP implementations and can reduce design complexity. In some implementations, a handoff request message does include the same resource information such as a Walsh code traffic index and frame offset.

Figure 5:
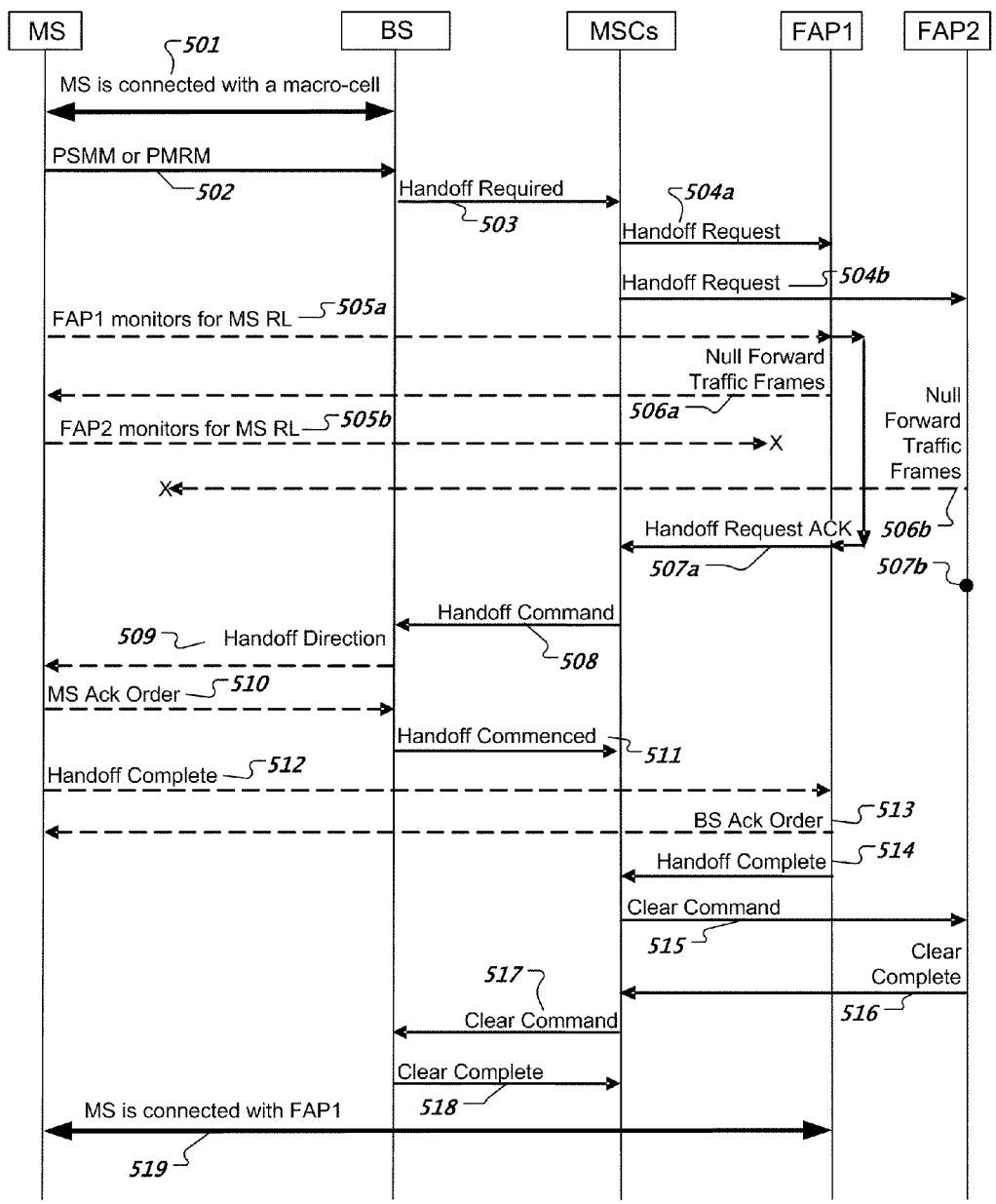
FIG. 5 shows an example of a handoff message flow in a wireless communication system.

FIG. 5 shows an example of a handoff message flow in a wireless communication system. In this example, a wireless communication system operates a BS such as a macro-cell BS to provide wireless service. The wireless communication system has assigned the same PN code to multiple femto-cell access points, e.g., FAP1 and FAP2, that provide coverage in different geographical areas of a coverage area of a macro-cell BS.

At 501, a mobile station is communicating with the macro-cell BS. In some implementations, the macro-cell BS communicates with the mobile station using one or more wireless channels such as a fundamental traffic channel or a supplemental traffic channel.

The mobile station can search for signals from other base stations based on a neighbor list. In some implementations, the mobile station receives a neighbor list message from the macro-cell BS. The neighbor list message can include identifiers of one or more base stations. In some implementations, an identifier is associated with a specific cell of a base station. In some implementations, the mobile station includes a memory that stores a white list containing identifiers of one or more base stations. The mobile station can perform measurements of the pilots of neighbor cells identified in the neighbor list. At 502, the mobile station sends the measurement results of one or more target cells to the macro-cell BS in a measurement message such as PSMM or PMRM.

The macro-cell BS can determine whether a handoff is required for the mobile station based on comparing target cell measurement(s) contained in the measurement message with one or more threshold values. At 503, the macro-cell BS sends a handoff message to a core network component of the wireless communication system to advance a handoff procedure.

In some implementations, the macro-cell BS can determine if a target cell, identified in a measurement message, is a FAP cell based on comparing a PN of the target cell with one or more value in a femto-cell pilot PN set, e.g., S-II. The macro-cell BS can include information in the handoff message that indicates that the handoff is associated with a FAP cell. In some implementations, if the SNR of a target FAP cell reaches a hand-in threshold, the macro-cell BS sends a Handoff Required message to a core network component such as a MSC, MSCe, or other core network nodes depending on the configuration of the core network.

The MSC can be configured to process handoff messages from base stations. Processing a handoff message can include determining whether the target cell identified in the message is a FAP cell. However, because the wireless communication system assigned the same PN to multiple FAP cells, the target cell in a handoff message can be associated with multiple FAPs.

In some implementations, if the PN code of a target cell is in a specific PN group such as S-II, the MSC recognizes that the target cell is a femto-cell and can request multiple femto-cells associated with the PN group to establish connections with the attempting hand-in mobile station via sending a Handoff Request message to each FAP in the PN group respectively. In this example, FAP1 and FAP2 are in the same PN group associated with the macro-cell BS. At 504*a*, the MSC sends a Handoff Request to FAP1. At 504*b*, the MSC sends a Handoff Request to FAP2.

A FAP can monitor one or more wireless channels to detect a signal from a mobile station attempting a hand-in. At 505*a*, a FAP can monitor for a RL signal from the MS. In this example, the FAP that is within wireless range of the mobile station (e.g., FAP1 in this example) is able to acquire a reverse link signal from the mobile station. At 506*a*, based on receiving the Handoff Request message from the MSC, FAP1 allocates radio resource(s) and starts transmitting one or more null traffic frames over the air. In some implementations, FAP1 turns on a receiver to start demodulating and decoding reverse link traffic frames sent by the mobile station.

At 505*b*, a FAP can monitor for a RL signal from the MS. A FAP, e.g., FAP2 in this example, that is not within wireless range of the mobile station is not able to acquire the reverse link signal of the mobile station. Despite this, FAP2 can attempt to communicate with the attempting hand-in mobile station. In some implementations, FAP2 can perform the handshaking process with the attempting hand-in mobile station via demodulating and decoding the reverse link traffic frames. At 506*b*, FAP2 can transmit one or more null forward traffic frames.

Based on limited wireless coverage areas of FAPs, only a FAP within range of the mobile station can successfully perform a handshaking process with the mobile station. In this example, FAP1 performs a successful handshaking with the attempting hand-in mobile station. At 507*a*, FAP1 sends a Handoff Request Ack message to the MSC to indicate the successful handshaking.

One or more FAPs associated with S-II may not be able to acquire reverse link traffic frames sent by the mobile station, e.g., FAP2. Such FAPs can send a message such as a Handoff Request Ack with a handshaking failure reason code. In some implementations, FAPs that are unable to acquire reverse link traffic frames do not respond to the MSC's Handoff Request message. At 507*b*, FAP2 does not send a message to indicate a failure to receive and decode a reverse link signal from the MS.

In some implementations, one or more FAPs associated with S-II are configured as closed access cells or with one or more access restrictions. Such FAPs can communicate with a core network component, such as a femto network configuration sever, to determine access permission for the attempting hand-in mobile station. If the mobile station does not have access permission, the FAP can send a Handoff Request Ack message with an access denied reason code to the MSC without performing a handshaking process with an attempting hand-in mobile station.

Based on receiving a Handoff Request Ack message that indicates a successful handshake, the MSC can control the serving macro-cell BS to hand-in the MS to a FAP identified by the Handoff Request Ack message. At 508, the MSC can send a message such as a Handoff Command Message, to the macro-cell BS. The Handoff Command Message can include a target FAP PN code, an allocated Walsh code channel index, and a frame offset.

At 509, the macro-cell BS sends a message such as a Handoff Direction Message to the mobile station over an existing air link connection. In some implementations, a Handoff Direction Message is a General Handoff Direction Message. In some implementations, a Handoff Direction Message is an Extended Handoff Direction Message. A Handoff Direction Message can include a target FAP PN code, an allocated Walsh code channel index, and a frame offset.

A Handoff Direction Message can control a mobile station to handoff to a FAP identified in the message. A Handoff Direction Message can control the mobile station to receive forward link frames on a specified Walsh traffic channel at a given frame offset. At 510, based on receiving the Handoff Direction message, the mobile station sends a message such as a MS Ack Order to the macro-cell BS.

At 511, the macro-cell BS sends a message such as a Handoff Commenced message to the MSC. At 512, the mobile station is connecting to FAP1 and sends a message such as a Handoff Complete message to FAP1. At 513, based on receiving the Handoff Complete message, FAP1 sends a BS Ack Order back to the mobile station. At 514, FAP1 sends a Handoff Complete message to the MSC to indicate the handoff complete success.

The MSC controls the FAPs associated with S-II that are not serving the mobile station to de-allocate resources allocated for the handoff. At 515, the MSC sends a Clear Command to FAP2 to control the FAP to re-allocate resources. At 516, FAP2 sends a Clear Complete to the MSC based on a de-allocation of handoff resources. At 517, the MSC sends a clear command to the macro-cell BS to request a de-allocation of handoff resource(s). At 518, the macro-cell BS sends a Clear complete to the MSC.

At 519, the mobile station is connected with FAP1 and can continue its wireless service. For example, the mobile station can continue a voice call uninterrupted during the hand-in process. In another example, the mobile station can continue sending or receiving data.

Figure 6:
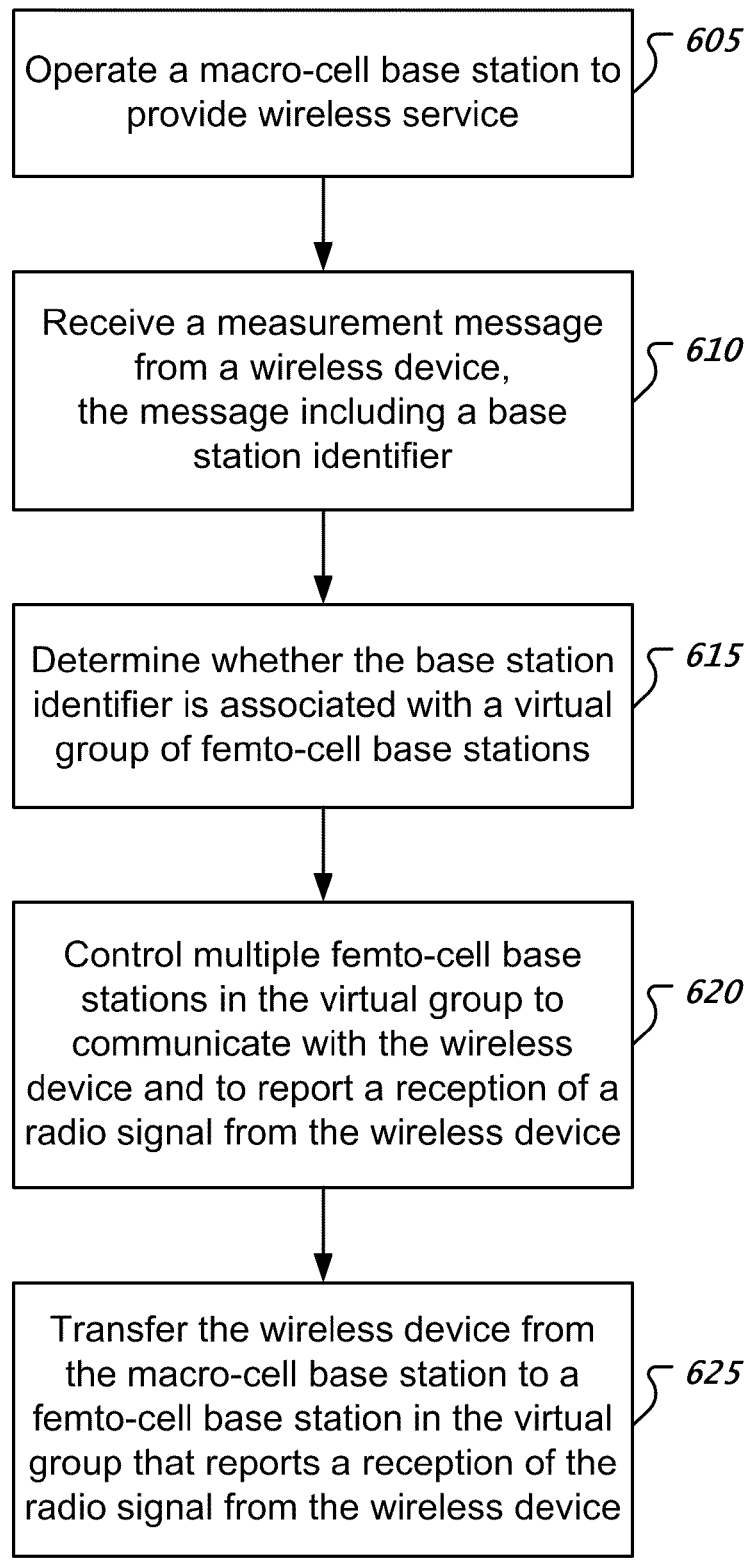
FIG. 6 shows an example of a femto-cell base station hand-in process.

FIG. 6 shows an example of a femto-cell base station hand-in process. A wireless communication system can be configured to operate a macro-cell base station to provide wireless service (605). The macro-cell base station can be configured to provide wireless service in a geographical coverage area.

The macro-cell base station can receive a measurement message from a wireless device (610). A measurement message can include one or more base station identifiers. In some implementations, a measurement message can include a measurement of a signal from a base station associated with a base station identifier. In some implementations, a measurement message can be indicative of a wireless device's request for a hand-in to a different base station.

The wireless communication system can determine whether the base station identifier is associated with a virtual group of femto-cell base stations (615). Each femto-cell base station associated with the virtual group is assigned the same base station identifier. In some implementations, a base station identifier is associated with a specific cell of a base station configured with multiple cells. For example, a base station can provide wireless service in one or more sectors, each sector associated with a base station identifier, e.g., cell identifier. The femto-cell base station associated with the virtual group can provide wireless service in different nonadjacent portions of the macro-cell base station's geographical coverage area The wireless communication system can control multiple femto-cell base stations in the virtual group to communicate with the wireless device and to report a reception of a radio signal from the wireless device (620). For example, a core network server can send a message to multiple femto-cell base stations in the virtual to initiate communications with the wireless device. A femto-cell base station that is receiving a reverse link signal from the wireless device can send a hand-off acknowledgement message to the core network server to report a reception of the wireless device's radio signal. The wireless communication system can transfer the wireless device from the macro-cell base station to a femto-cell base station in the virtual group that reports a reception of the radio signal from the wireless device (625).

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   operating a macro-cell base station to provide wireless service to wireless devices in a geographical coverage area;
   receiving, from a wireless device, a message indicative of the wireless device's reception of a base station radio signal, the message comprising a base station identifier;
   controlling, using a core network server, multiple femto-cell base stations that are assigned to the base station identifier to assign resources to communication with the wireless device, communicate null forward traffic frames with the wireless device and attempt communication with the wireless device, wherein the multiple femto-cell base stations provide wireless service in different nonadjacent portions of the geographical coverage area;
   transferring the wireless device from the macro-cell base station to a femto-cell base station of the multiple femto-cell base stations that reports a reception of the radio signal from the wireless device; and sending a command from the core network server to remaining base stations of the multiple femto-cell base stations to de-allocate resource allocated to wireless device handoff.

2. The method of claim 1, wherein controlling the multiple femto-cell base stations comprises sending a handoff request message to each of the femto-cell base stations.

3. The method of claim 1, wherein controlling the multiple femto-cell base stations comprises controlling a femto-cell base station to send a handoff request acknowledgment message to a core network based on a reception of the radio signal from the wireless device.

4. The method of claim 1, wherein the received message comprises a measurement message, wherein the measurement message comprises the base station identifier and a measurement of the base station radio signal, wherein the base station radio signal is generated based on the base station identifier.

5. The method of claim 1, wherein the base station identifier is a pseudorandom noise (PN) code.

6. The method of claim 1, operating a macro-cell base station to provide wireless service comprises operating the macro-cell base station based on a Code Division Multiple Access (CDMA) air link technology.

7. The method of claim 1, operating a macro-cell base station to provide wireless service comprises operating the macro-cell base station based on a Long Term Evolution (LTE) technology.

8. A method for wireless communications, comprising:
assigning a communication code from a first group of communication codes used for wireless identification to a base station, wherein the base station is configured to provide coverage to a service area;
assigning a communication code from a second, different group of communication codes used for wireless identification to multiple femto-cell access points that provide coverage in different nonadjacent portions of the service area;
operating a core network server to request multiple femto-cell access points assigned to the same communication code to establish connections with a mobile station in communication with the base station;
operating multiple femto-cell access points assigned to the same communication code to handle a hand-in request from the mobile station in communication with the base station by assigning resources to communication with the mobile station and communicating null forward traffic frames with the mobile station;
controlling the femto-cell access points assigned to the same communication code to report to a core network server a status of a handshake with the mobile station; and
selecting, based on the reported status, one of the controlled femto-cell access points to complete the hand-in request.

9. The method of claim 8, further comprising:
controlling the femto-cell access points assigned to the same communication code who are not selected to complete the hand-in request to free resources allocated for the hand-in request.

10. The method of claim 8, wherein the first group comprises pseudorandom noise codes, wherein the second group comprises different pseudorandom noise codes.

11. A wireless communication system, comprising:
a macro-cell base station configured to provide wireless service to wireless devices in a geographical coverage area and receive, from a wireless device, a message indicative of the wireless device's reception of a base station radio signal, the message comprising a base station identifier;
a mechanism, at a core network server, configured to attempt communications between multiple femto-cell base stations and the wireless device by controlling multiple femto-cell base stations that are assigned to the base station identifier to assign resources to communication with the wireless device and to communicate null forward traffic frames with the wireless device, wherein the multiple femto-cell base stations provide wireless service in different nonadjacent portions of the geographical coverage area;
a mechanism configured to transfer the wireless device from the macro-cell base station to a femto-cell base station of the multiple femto-cell base stations that reports a reception of the radio signal from the wireless device; and
a mechanism configured to send a command from the core network server to remaining base stations of the multiple femto-cell base stations to de-allocate resource allocated to wireless device handoff.

12. The system of claim 11, wherein the mechanism configured to control multiple femto-cell base stations is configured to send a handoff request message to each of the femto-cell base stations.

13. The system of claim 11, wherein the mechanism configured to control multiple femto-cell base stations is configured to control a femto-cell base station to send a handoff request acknowledgment message to a core network based on a reception of the radio signal from the wireless device.

14. The system of claim 11, wherein the message received by the macro-cell base station comprises a measurement message, wherein the measurement message comprises the base station identifier and a measurement of the base station radio signal, wherein the base station radio signal is generated based on the base station identifier.

15. The system of claim 11, wherein the base station identifier is a pseudorandom noise (PN) code.

16. The system of claim 11, wherein the macro-cell base station is configured to operate based on a Code Division Multiple Access (CDMA) air link technology.

17. The system of claim 11, wherein the macro-cell base station is configured to operate based on a Long Term Evolution (LTE) technology.

* * * * *